(12) United States Patent
Chen et al.

(10) Patent No.: US 8,671,863 B2
(45) Date of Patent: Mar. 18, 2014

(54) HULL CONVERSION OF EXISTING VESSELS FOR TANK INTEGRATION

(75) Inventors: Yun Shui Chen, Singapore (SG); Wen Sin Chong, Singapore (SG)

(73) Assignee: Keppel Offshore & Marine Technology Centre Pte Ltd, Singapore (SG)

( * ) Notice: Subject to any disclaimer, the term of this patent is extended or adjusted under 35 U.S.C. 154(b) by 234 days.

(21) Appl. No.: 13/123,433

(22) PCT Filed: Oct. 9, 2009

(86) PCT No.: PCT/SG2009/000372
§ 371 (c)(1),
(2), (4) Date: Apr. 8, 2011

(87) PCT Pub. No.: WO2010/042075
PCT Pub. Date: Apr. 15, 2010

(65) Prior Publication Data
US 2011/0192339 A1 Aug. 11, 2011

Related U.S. Application Data

(60) Provisional application No. 61/104,059, filed on Oct. 9, 2008.

(51) Int. Cl.
*B63B 25/08* (2006.01)
(52) U.S. Cl.
USPC ...................................... 114/74 A; 114/74 R
(58) Field of Classification Search
USPC ............... 114/65 R, 72, 73, 74 A, 74 R, 74 T
See application file for complete search history.

(56) References Cited

U.S. PATENT DOCUMENTS

| | | | |
|---|---|---|---|
| 3,288,097 A | | 11/1966 | Boston |
| 3,623,626 A | * | 11/1971 | Bridges ........................ 114/74 A |
| 3,631,832 A | * | 1/1972 | Rodriguez ................... 114/74 R |
| 3,680,323 A | | 8/1972 | Bognaes et al. |
| 3,861,021 A | * | 1/1975 | Yamamoto .................. 114/74 A |
| 4,135,465 A | * | 1/1979 | Dudley et al. ............... 114/74 A |
| 5,189,975 A | | 3/1993 | Zednik et al. |
| 5,909,715 A | | 6/1999 | Menon |
| 6,170,420 B1 | | 1/2001 | Hagner et al. |
| 6,708,636 B1 | | 3/2004 | Hagner |
| 7,077,071 B2 | | 7/2006 | Neu |
| 2009/0301379 A1 | | 12/2009 | Erstad et al. |

FOREIGN PATENT DOCUMENTS

| | | |
|---|---|---|
| DE | 14 56 233 A1 | 10/1969 |
| DE | 24 62 202 A1 | 8/1976 |
| JP | 53-040995 | 4/1978 |
| JP | 53-040995 A | 4/1978 |
| JP | 58-174077 A | 10/1983 |
| JP | 58-174078 A | 10/1983 |
| JP | 59-156885 A | 9/1984 |
| JP | 58-175174 A | 10/1984 |

(Continued)

*Primary Examiner* — Lars A Olson
(74) *Attorney, Agent, or Firm* — Arent Fox LLP (57) ABSTRACT

The present disclosure relates to hull conversion of existing vessel for tank integration to allow storage of multiple hydrocarbon and non-hydrocarbon products onboard the existing vessel. In a converted vessel, a first liquefied hydrocarbon fluid may be stored in an added independent tank, while a second hydrocarbon fluid or a non-hydrocarbon fluid may be stored in an un-converted carge tank, which can be any one of a centre cargo tank, a port side tank or a starboard side tank.

29 Claims, 6 Drawing Sheets

(56) References Cited

FOREIGN PATENT DOCUMENTS

| JP | 59-176173 A | 10/1984 |
| JP | 59-184084 A | 10/1984 |
| WO | WO 2007/089159 A1 | 8/2007 |

* cited by examiner

HULL CONVERSION OF EXISTING VESSELS FOR TANK INTEGRATION

CROSS-REFERENCE TO RELATED APPLICATION

This application is a National Stage entry of International Application No. PCT/SG2009/000372, filed Oct. 9, 2009, which claims priority to U.S. Provisional Patent Application No. 61/104,059 filed Oct. 9, 2008. The disclosures of the prior applications are incorporated herein by reference in their entirety.

BACKGROUND

1. Technical Field

Embodiments of the invention relate generally to hull conversion of an existing vessel such as an oil tanker vessel or a bulk carrier for integrating one or more tanks for storing hydrocarbon and non-hydrocarbon fluids.

2. Description of Related Art

Substantial cost savings can be realized by modifying or converting hull designs of vessels to extend the life of the vessels rather than constructing a new vessel.

U.S. Pat. No. 7,077,071 B2 (Neu) discloses a method for converting a single-hull vessel to a double hull vessel, and the converted double hull vessel. The single hull vessel to be converted has an outer hull surrounding a center cargo tank flanked by a port wing tank and a starboard wing tank, with spaced-apart transverse bulkheads extending between the port and starboard wing tanks to form one or more central tanks. An elevated floor is added to the central cargo tanks by installing new bottom plating spanning the transverse bulkheads and the sidewalls of the wing tanks. Support members are added to increase the strength of the elevated floor, the cargo tank, and the wing tanks, as needed. A sealed compartment is formed by the new elevated floor, the outer hull, and the sidewalls and bulkheads to protect the cargo from leaking out of the vessel should the integrity of the single hull be breached. The method achieves conversion of the single hull vessel to a double hull construction without breaching the integrity of the pre-existing single outer hull, and thus is faster and easier in converting single hull vessels to minimize cost of conversion and vessel outage.

U.S. Pat. No. 6,708,636 B1 (Hagner) discloses a rebuilt double hull tanker and a method of rebuilding an existing single hull tanker into a rebuilt double hull tanker. The rebuilt double hull tanker includes a rebuilt double hull comprising a new double bottom hull and new double side hulls. The internally rebuilt double bottom hull includes the existing outer bottom hull and a new inner bottom hull that is disposed internal and spaced apart from the existing outer bottom hull. The externally rebuilt double side hulls (e.g., port and starboard) include the existing inner side hulls and new outer side hulls disposed external and spaced apart from the existing inner side hull. The rebuilt double bottom hull is connected at each end (e.g., at the turn of the bilge) to the rebuilt double side hulls. The method includes forming the new double hull, including a new double bottom hull and new double side hulls, over at least the cargo carrying portion of the tanker by installing the new inner bottom hull internally over the existing outer bottom hull through access holes cut into the sides of the tanker and installing the new double side hulls externally over the existing inner side hulls.

Additional information relating to hull conversion or rebuild can be found in U.S. Pat. No. 5,909,715 (Menon), International Application Publication No. WO 2007/089159 (Framo Engineering AS), U.S. Pat. No. 5,189,975 (Zednik et al.), and U.S. Pat. No. 6,170,420 (Hagner et al.).

SUMMARY

The present disclosure provides hull conversion systems and methods for tank integration. As will be appreciated from the present disclosure, embodiments of the invention allow storage of multiple products including, but not limited to, hydrocarbon products, e.g., crude oil, liquefied natural gas (LNG), liquefied petroleum gas (LPG) and condensate, in various forms, e.g. liquid, liquefied gas, and non-hydrocarbon products, e.g. water, air, within a converted vessel.

According to one embodiment of the invention, a tank-integrated vessel, converted from an existing vessel, for storing multiple hydrocarbon products, the tank-integrated vessel comprises at least one converted cargo tank and at least one unconverted cargo tank. A converted cargo tank may comprise an added tank support structure disposed in the at least one converted cargo tank, at least one added independent tank disposed upon the added tank support structure, wherein the added independent tank is operable to store a first liquefied hydrocarbon fluid, and a newly-attached upper deck overlaying the at least one added independent tank. An unconverted cargo tank is operable to store a second hydrocarbon fluid.

Further, an intermediate deck plate may be added to the cargo tank to provide a double bottom hull structure or to provide additional support for the added independent tank. Further, a space between the added intermediate deck plate and an existing hull structure may be partitioned into one or more enclosures. These enclosures may store the second hydrocarbon fluid or a non-hydrocarbon fluid. These enclosures may be provided in fluid communication with an adjacent unconverted cargo tank.

BRIEF DESCRIPTION OF THE DRAWINGS

Embodiments of the invention are disclosed hereinafter with reference to the drawings, in which.

DETAILED DESCRIPTION

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

In the present description, existing vessels may be an oil tanker, a bulk carrier, a Floating Production, Storage and Offloading (FPSO) vessel, a Floating Storage and Offloading (FSO) vessel. The independent tanks to be integrated into existing vessels may be Type A, Type B or Type C, according to The International Code for the Construction and Equipment of Ships Carrying Liquefied Gases in Bulk (IGC Code) and International Maritime Organization (IMO) rules, such as but not limited to, MOSS-type tank, Self-supporting Prismatic type B (SPB) tank, and pressure tank.

Depending on capacity requirements, selected some or all cargo tanks of an existing vessel may be converted. Although the present disclosure largely describes the conversion of centre cargo tanks, it is to be appreciated that other cargo tanks of a vessel, e.g. port side wing tank and starboard side wing tank, may be converted in a similar manner. Also, one or a combination of the centre cargo tanks, port side wing tank and starboard side wing tank of a vessel may be converted.

Conversion from a Single Hull Oil Tanker

Figure 1A:
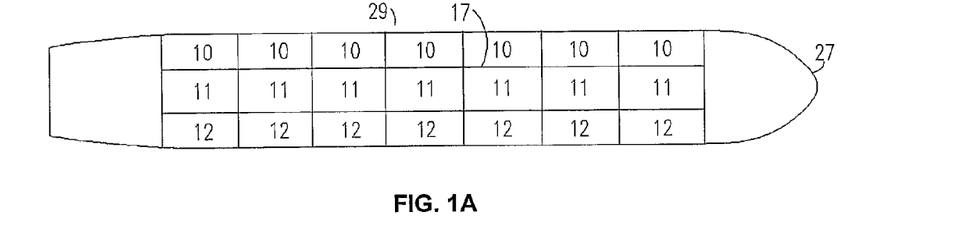
FIG. 1A is a plan layout of a single hull oil tanker.

Reference is made to FIG. 1A illustrating a plan layout of a single hull oil tanker vessel 27 having multiple independent sections arranged along a longitudinal direction of the vessel 27. As shown, in one of the sections in an amidships portion 29 of the vessel 27, the vessel 27 has a port side wing tank 10 and a starboard side wing tank 12. Interposed between the port and starboard wing tanks 10, 12, the vessel 27 has a centre cargo tank 11 arranged therein. The centre tank 11 may be arranged longitudinally along a centre line in the amidships portion 29 of the vessel 27. The centre cargo tanks 11 of adjacent sections may be independent of each other.

Figure 1B:
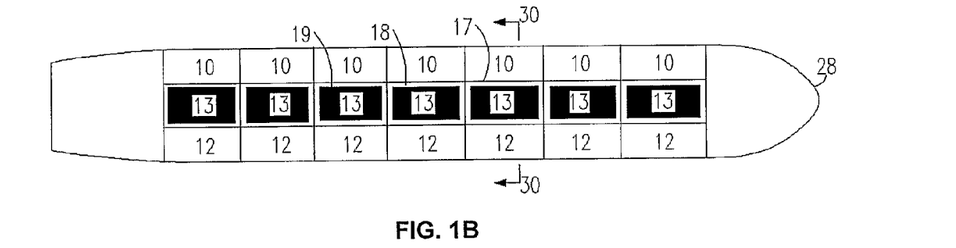
FIG. 1B is a plan layout of a converted vessel of FIG. 1A.

Reference is made to FIG. 1B illustrating a plan layout of a converted vessel 28 of FIG. 1A. More particularly, independent storage tanks 13 are installed or added into centre cargo tanks 11. It is to be appreciated that, in some embodiments of the invention, centre cargo tanks 11 of selected sections are converted depending on the capacity required. For instance, if production capacity of a liquefied hydrocarbon fluid is small, certain selected centre cargo tanks 11 are to be converted; however, if production capacity is large, all centre cargo tanks 11 are to be converted.

Figure 1C:
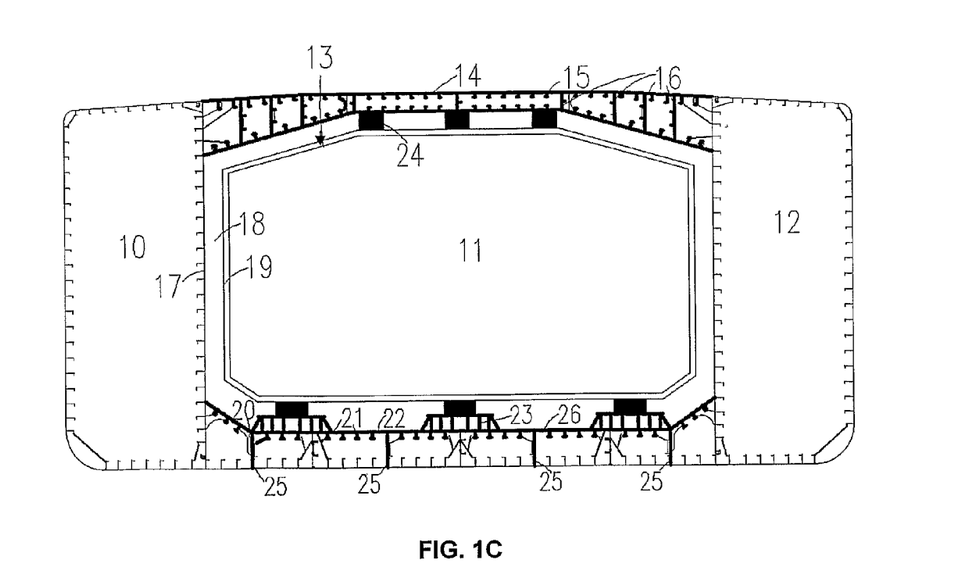
FIG. 1C is a mid-ship cross-sectional view of FIG. 1B according to one embodiment of the invention.

Reference is made to FIG. 1C illustrating a mid-ship cross-sectional view of FIG. 1B, taken along arrow lines 30-30, according to one embodiment of the invention. The converted vessel 28 includes one or more independent tanks 13 installed or added in a centre cargo tank 11. The independent tank 13 may be Type B tanks according to The International Code for the Construction and Equipment of Ships Carrying Liquefied Gases in Bulk (IGC Code), or other suitable tank types. The converted vessel 28 has an outer bottom hull formed of an existing outer bottom hull, and an added intermediate deck plate 22 installed in the centre cargo tank 11 to form a double bottom hull structure. The added intermediate deck plate 22 and the outer bottom hull are vertically spaced apart. In this space between the added intermediate deck plate and the outer bottom hull, various added support members may be installed for reinforcement of the intermediate deck plate 22. For example, longitudinal stiffeners 21 may be installed on an underside of the added intermediate deck plates 22 to provide a longitudinal framing system. Scantlings for the intermediate deck plates 22 may be designed to support an independent tank 13 at a maximum load condition. Additionally, several large longitudinal girders 25 may be installed on either side of the centre girder to increase the hull section modulus and to support the added intermediate deck plate 22. Optimized brackets 20 may be installed to minimize the fatigue damage, during the service life, at an intersection between the added intermediate deck plate 22 and large longitudinal girders 25. Further, the longitudinal centre girder may be strengthened or reinforced.

At least one added independent tank 13 may be installed into the converted centre cargo tank 11. Before installing the added independent tank 13, one or more added tank support structures 23 may be installed on the added intermediate deck plate 22 to support the independent tank 13 under all load conditions without any damage resulted from large hull deformation and inertial load. Further, a portion of an existing upper deck overlaying the centre cargo tank 11, may be cut or removed to provide temporary access for installing the independent tank 13 into the centre cargo tank 11. Chocks 24 may be installed on the top of the independent tank 13 to restrain the independent tank 13 from rolling, pitching and floating movement. A hold space 18 between a longitudinal bulkhead 17 (or a sidewall of the centre cargo tank 11) and an external surface 19 of an added independent tank 13 may be provided to allow access for inspection. An inert gas may be filled in the hold space 18.

A newly-attached deck structure that overlays the independent tank 13 to enclose the independent tank 13 in the centre cargo tank 11 may be a cut portion from an existing upper deck, or a modified deck from the cut upper deck, or a newly-constructed upper deck, e.g. a double deck structure. A newly-constructed double deck structure may comprise two new decks 14, several longitudinal deck girders 16 and longitudinal stiffeners 15 installed between the decks 14. The newly-constructed double deck structure may increase the section modulus and support the load of large topside modules. Additionally, the newly-constructed double deck structure may protect the independent tank from damage in case of cryogenic hydrocarbon fluid leak from the topside modules or falling substances from the topside. Scantlings for the new double deck structure may be designed to withstand longitudinal strength and deformation and support the topside modules under all load conditions.

Where a partial secondary barrier is required, one or more drip trays (not shown) may be provided upon the added intermediate deck plate to collect cryogenic cargo in case of the tank cargo leakage. The existing hull structures in the hold space 18 should be protected in case the temperature of the existing hull structures falls below the critical temperature after the integration of independent tank 13. As such, an added insulation material 26 may be installed on a surface of the existing hull structures to avoid replacement of existing hull structure due to the low temperature after integration of the independent tank 13. Examples of suitable insulation materials include, but are not limited to glass wool, expanded perlite, polyurethane and concrete. The insulation material may be provided in a fibrous, granular, cellular, or foam form. Alternatively, a heating system (not shown) may be provided in the hold space 18 to maintain a temperature of existing hull structures within a limited range in case the temperature of the existing hull structure falls below the critical temperature after integration of independent tank 13.

In the converted vessel 28, a first liquefied hydrocarbon fluid may be stored in the added independent tank 13, while a second hydrocarbon fluid or a non-hydrocarbon fluid may be stored in an unconverted cargo tank, which can be any one of a centre cargo tank, a port side tank or a starboard side tank.

Figure 2A:
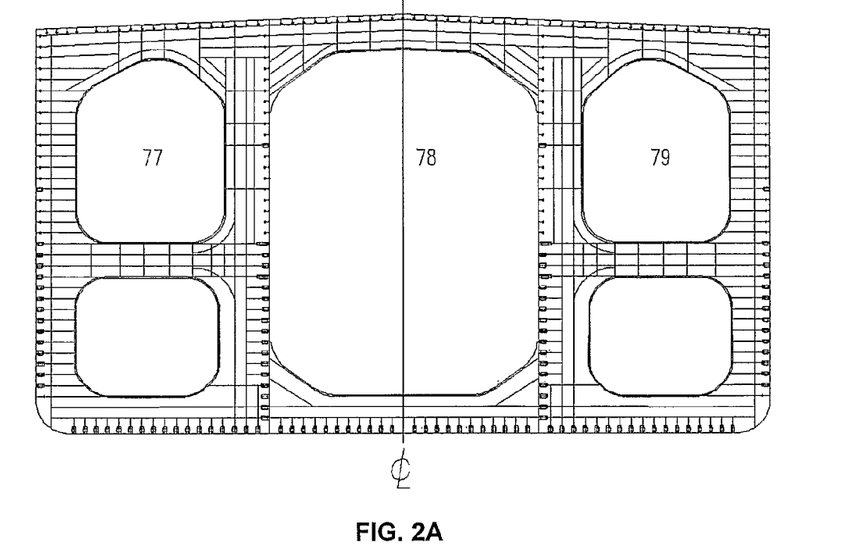
FIG. 2A is a mid-ship cross-sectional view of a single hull oil tanker.

Reference is made to FIG. 2A illustrating is a mid-ship cross-sectional view of a single hull oil tanker. The vessel has port side wing tank 77 and starboard side wing tank 79. Interposed between the port and starboard wing tanks 77, 79 the vessel has a centre cargo tank 78 arranged therein.

Figure 2B:
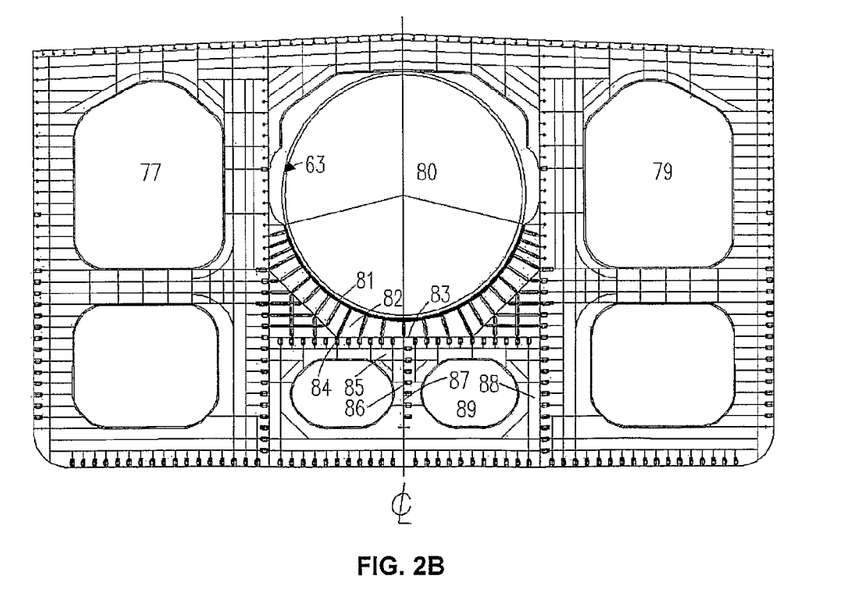
FIG. 2B is a mid-ship cross-sectional view of a converted vessel of FIG. 2A according to one embodiment of the invention.

Reference is made to FIG. 2B illustrating a mid-ship cross-sectional view of a converted vessel of FIG. 2A according to one embodiment of the invention. As shown, the converted vessel has a Type C independent tank of the IGC code, but it is to be appreciated that other tank types may be installed with suitable modification.

The converted vessel of FIG. 2B has an outer bottom hull formed of an existing outer bottom hull, and an added intermediate deck plate 83 installed in the centre cargo tank 78 to form a double bottom hull structure for supporting an added independent tank 63. The added intermediate deck plate 83 and the outer bottom hull are vertically spaced apart. In this spaced apart distance between the added intermediate deck plate and the outer bottom hull, longitudinal stiffeners 84 may be installed to an underside of the added intermediate deck plate 83, one longitudinal centre bulkhead 87 or web frame with longitudinal stiffeners 86 may be installed to provide a longitudinal framing system to support the independent tank 63. Webs 85 may be installed to the added intermediate deck plate 83; vertical girders 88 for longitudinal bulkheads may be installed in each typical strength frame. Scantlings for the added intermediate deck plate 83, longitudinal stiffeners 84, longitudinal centre bulkhead 87, webs 85 and vertical girders 88 may be suitably designed to support the independent tank 63 under maximum load condition without any failure and damage.

The longitudinal centre bulkhead 87 is suitably arranged to partition a space 89 between the added intermediate deck plate 83, the outer bottom hull and side walls of the centre cargo tank to form one or more added enclosures where other hydrocarbon or non-hydrocarbon products may be stored. Suitable fluid channels may be provided between one of the added enclosures and an adjacent unconverted cargo tank, e.g. port side wing tank 77 or starboard side wing 79, such that the added enclosure is in fluid communication therewith. This would allow an increase in storage capacity of fluids. According to one aspect of the invention, multiple products may be stored in a converted vessel, by storing a first liquefied hydrocarbon fluid, e.g. LNG, LPG, in the independent tank 63, and further storing a second hydrocarbon fluid, e.g. crude oil, or non-hydrocarbon fluid in the added enclosures which are in fluid communication with an adjacent unconverted cargo tank.

Similarly, added tank support structures 82 are installed on the added intermediate deck plate 83 of the converted centre cargo tanks. Two tank support structures 82 may be provided for each independent tank: a fixed tank support and a sliding tank support to absorb the large deformation. Plywood blocks 81 may be installed the between independent tank 63 and tank support structures 82 as insulation and to prevent the independent tank 63 from damage due to rigid compact. Similarly, a newly-attached upper deck that overlays the independent tank 63 to enclose the independent tank 63 in the centre cargo tank 78 may be a cut portion of an existing upper deck, or a modified deck from the cut upper deck, or a newly-constructed upper deck, e.g. a double deck structure.

Conversion from a Double Hull Oil Tanker

Figure 3A:
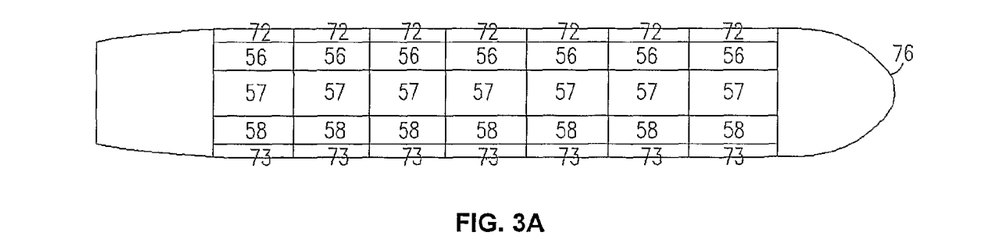
FIG. 3A is a plan layout of a double hull oil tanker.

Reference is made to FIG. 3A illustrating a plan layout of a double hull oil tanker vessel 76 having multiple independent sections arranged along a longitudinal direction of the vessel 76. In one of the sections in the amidships portion of the vessel 76, the vessel 76 has a port side double side ballast tank 72 and wing tank 56 and a starboard side double side ballast tank 73 and wing tank 58. Between the port and starboard wing tanks 56, 58, the vessel 76 has a centre cargo tank 57 arranged therein which may be arranged longitudinally along a centre line of the vessel 76 in the amidships portion of the vessel 76. The centre cargo tanks 57 of adjacent sections may be independent of each other.

Figure 3B:
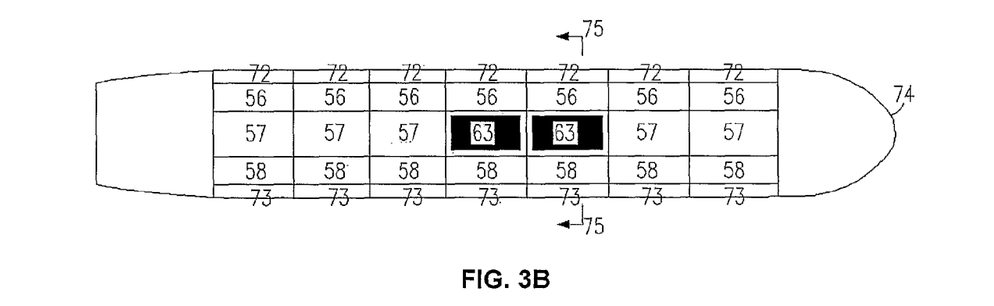
FIG. 3B is a plan layout of a converted vessel of FIG. 3A.
Figure 3C:
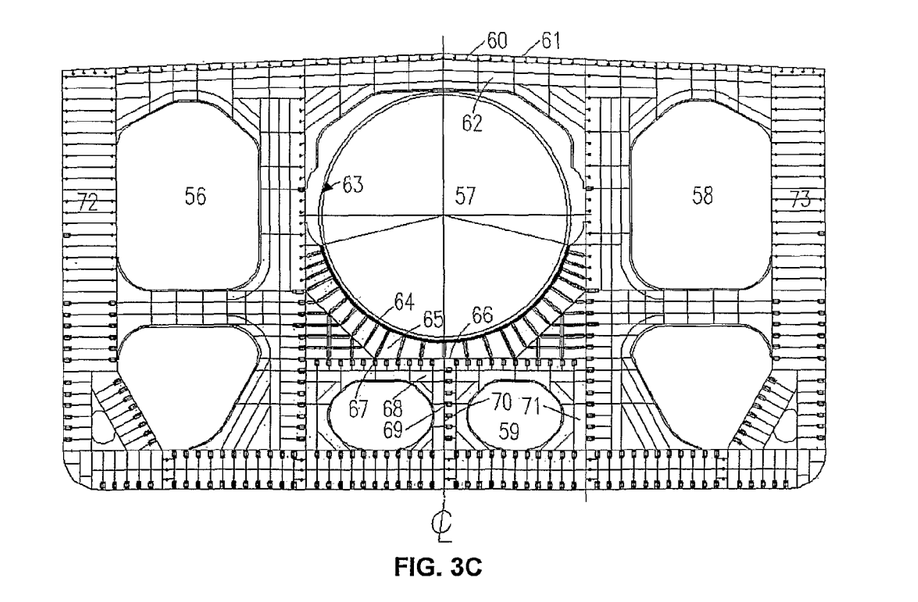
FIG. 3C is a mid-ship cross-sectional view of FIG. 3B according to one embodiment of the invention.

Reference is made to FIG. 3B illustrating a plan layout of a converted vessel of FIG. 3A having two of the centre cargo tanks 57 converted, and to FIG. 3C illustrating a mid-ship cross-sectional view of FIG. 3B, taken along arrow lines 75-75, according to one embodiment of the invention. As shown, the converted vessel has a Type C independent tank of the IGC code, but it is to be appreciated that other tank types may be installed with suitable modification.

The converted vessel of FIG. 3C has an outer bottom hull formed of an existing outer bottom hull, and an inner bottom hull formed of an existing inner bottom plate, and an new intermediate structure formed of an added intermediate deck plate 66 installed in the centre cargo tank 57 for supporting an added independent tank 63. The added intermediate deck plate 66 and the existing inner bottom hull are vertically spaced apart. Similar to the embodiment of FIG. 2B, in this spaced apart distance between the existing inner bottom hull and the added intermediate deck plate 66, longitudinal stiffeners 67 may be installed or added to an underside of the added intermediate deck plate 66, one longitudinal centre bulkhead 70 with longitudinal stiffeners 69 may be installed to provide a longitudinal framing system to support the independent tank 63. Webs 68 may be installed to the added intermediate deck plate 66; vertical girders 71 for longitudinal bulkheads may be installed in each typical strength frame. Scantlings for the added intermediate deck plate 66, longitudinal stiffeners 69, longitudinal centre bulkhead 70, webs 68 and vertical girders 71 may be suitably designed to support the independent tank 63 under maximum load condition without any failure and damage.

Also similar to the embodiment of FIG. 2B, the longitudinal centre bulkhead 70 is suitably arranged to partition a space 59 between the added intermediate deck plate 66, the existing inner bottom hull and side walls of the centre cargo tank to form one or more added enclosures where other products, e.g. crude oil, water, air, may be stored. Suitable fluid channels may be provided between one of the added enclosures and an adjacent unconverted cargo tanks, e.g. port side wing tank 56 or starboard side wing 58 such that the added enclosure is in fluid communication therewith. This would allow an increase in storage capacity of fluids. According to one aspect of the invention, multiple products may be stored in a converted vessel, by storing a first liquefied hydrocarbon fluid, e.g. LNG, LPG, in the independent tank 63, and further storing a second hydrocarbon fluid, e.g. crude oil, or a non-hydrocarbon fluid, e.g. water, air, in the added enclosures which is in fluid communication with an adjacent unconverted cargo tank, e.g. port side wing tank 56 or starboard side wing 58. According to another aspect of the invention where only selected cargo tanks are converted, the second hydrocarbon fluid may alternatively be stored in those unconverted cargo tanks, e.g. centre cargo tank 57, port side wing tank 56 or starboard side wing 58.

Similar to the embodiment of FIG. 2B, added tank support structures 65 are installed on the added intermediate deck plate 66 of the converted centre cargo tanks 57. Two tank support structures 65 may be provided for each independent tank: a fixed tank support and a sliding tank support to absorb the large deformation. Plywood blocks 64 may be installed the between added independent tank 63 and added tank support structures 65 as insulation and to prevent the independent tank 63 from damage due to rigid compact. Similarly, a new-installed upper deck that eventually overlays the independent tank 63 to enclose the independent tank 63 in the centre cargo tank 57 may be a cut portion of an existing upper deck, or a modified deck from the cut upper deck, or a newly constructed upper deck. If a newly constructed deck structure 61 is installed, the new deck structure 61 may comprise longitudinal 60, deck web 62 for withstanding large topside load and preventing the independent tank 63 from any damage due to the dynamic load transferred from the topside.

The existing hull structures within a hold space should be protected in case the temperature of the existing hull structures falls below the critical temperature after the integration of independent tank 63. As such, an added insulation material may be installed on a surface of the existing hull structures to avoid replacement of existing hull structure due to the low temperature after integration of the independent tank 63. Alternatively, a heating system (not shown) may be provided in the hold space to maintain a temperature of existing hull structures within a limited range in case the temperature of the existing hull structure falls below the critical temperature after integration of independent tank 63.

Figure 3D:
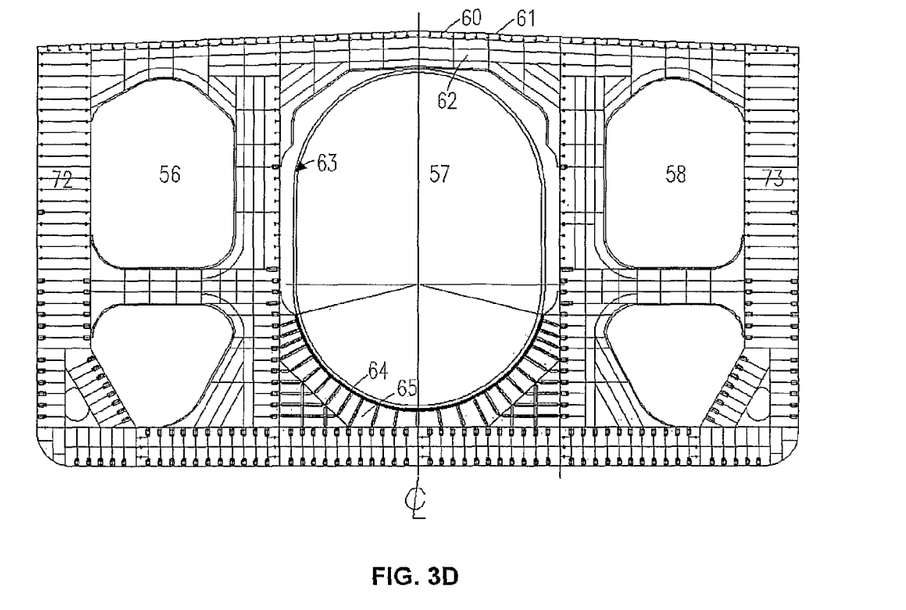
FIG. 3D is a mid-ship cross-sectional view of FIG. 3B according to one embodiment of the invention.

Reference is made to FIG. 3D illustrating a mid-ship cross-sectional view of FIG. 3B, taken from arrow lines 75-75, according to one embodiment of the invention. In this embodiment, there is no added intermediate deck plate or added longitudinal bulkhead. At least one independent tank 63 is integrated or added into the centre tanks 57 of the vessel 76. The new independent tank 63 may have an extended middle portion and two hemispheric top and bottom ends to better utilize the space within the centre cargo tank 57.

Figure 3E:
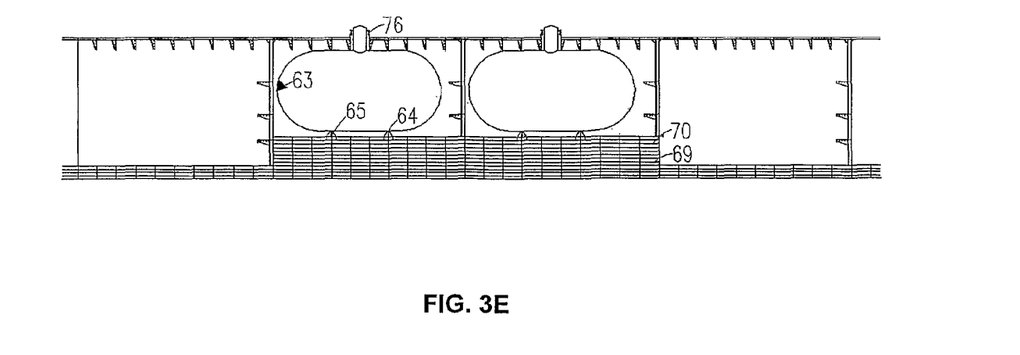
FIG. 3E is a longitudinal centre cross-sectional view of FIG. 3B.

Reference is made to FIG. 3E illustrating a longitudinal centre cross-sectional view of FIG. 3C. As shown, a dome may be provided at the top of the independent tank 63 which is penetrated through the upper deck of the vessel. The dome may be used for inspection access and introduction of pipe lines into the independent tank 63. These pipe lines may allow supply of LNG from a topside LNG process plant to the independent tank 63. A neoprene membrane structure 76 may be installed round the dome from the upper deck to absorb dome deformation due to expansion or contraction with or without LNG stored in the independent tank 63.

In addition to converting centre cargo tanks of a double hull oil tanker, the port side wing tanks 56, or starboard side wing tanks 58, or both may be converted to integrate or add independent tanks therein in a similar manner as described above.

Conversion from a Double Hull Bulk Carrier

Figure 4A:
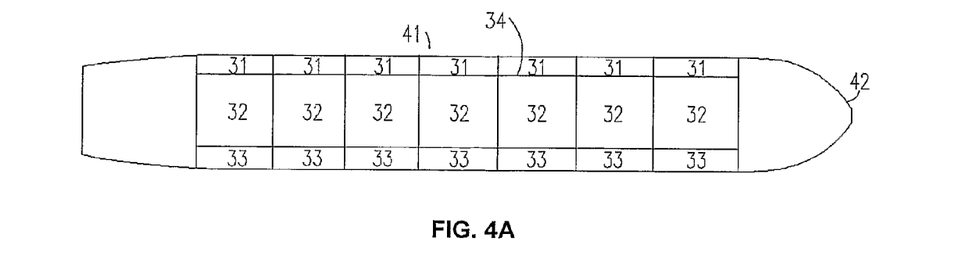
FIG. 4A is a plan layout of a double hull bulk carrier.

Reference is made to FIG. 4A illustrating a plan layout of a double hull bulk carrier having multiple independent sections arranged along a longitudinal direction of the vessel 42. As shown, in one of the sections in the amidships portion 41 of the vessel 42, the vessel 42 has a port side wing tank 31 and a starboard side wing tank 33 typically used as the ballast water tanks. Interposed between the port and starboard wing tanks 31, 33, the vessel 42 has a large centre cargo hold 32 which may be arranged longitudinally along a centre line of the vessel 42 in the amidships portion 41 of the vessel 42. The centre cargo tanks 32 of adjacent sections may be independent of each other.

Figure 4B:
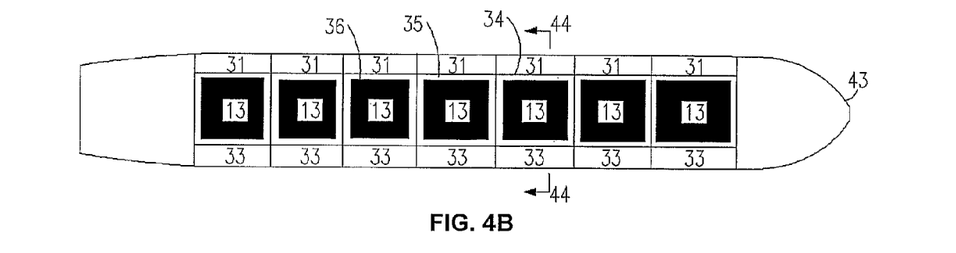
FIG. 4B is a plan layout of a converted vessel of FIG. 4A.
Figure 4C:
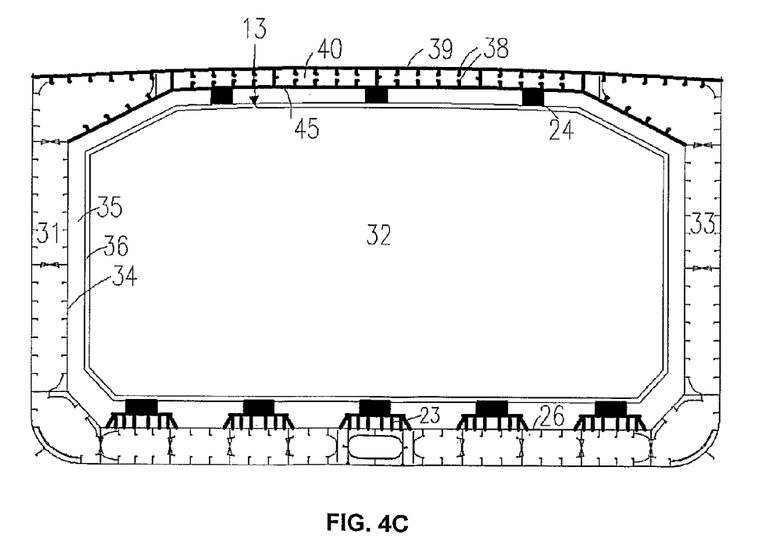
FIG. 4C is a mid-ship cross-sectional view of FIG. 4B according to one embodiment of the invention.

Reference is made to FIG. 4B illustrating a plan layout of a converted vessel of FIG. 4A where independent storage tanks 13 are installed or disposed in centre cargo tanks 11. Reference is also made to FIG. 4C illustrating a mid-ship cross-sectional view of FIG. 4B, taken along arrow lines 44-44, according to one embodiment of the invention.

Similar to the foregoing embodiments, an added independent tank 13 is installed or disposed in the centre cargo tank 32 on an existing double bottom hull structure. The existing inner bottom hull may be strengthened or reinforced by installing or attaching an added inner bottom hull plate on the existing inner bottom hull to meet the strength requirements. Tank support structures 23 may be installed on the existing inner bottom hull or added inner bottom hull plate to support an added independent tank 13 under various load conditions. Chocks 24 may be installed on the top of the independent tank 13 to restrain roll and pitch movements of the independent tank 13. A hold space 35 between an inner shell plate 34 and an external surface 36 of the independent tank 13 is provided for inspection access. A newly-constructed double deck structure 40, comprising a new upper deck 39, a new lower plate 45, longitudinal stiffeners 38 and several longitudinal deck girders, may be installed to enclose the independent tank 13 in the centre cargo tank 32. Where a partial secondary barrier is required, one or more drip trays (not shown) may be provided upon the existing inner bottom hull to collect cryogenic cargo in case of the tank cargo leakage. The existing hull structures in hold space 35 should be protected in case the temperature of the existing hull structures would fall below the critical temperature after the integration of independent tank 13. As such, an added insulation material 26 may be installed on a surface of the existing hull structures to avoid replacement of existing hull structure due to the low temperature after integration of the independent tank 13. Alternatively, a heating system (not shown) may be provided in the hold space 35 to maintain a temperature of existing hull structures within a limited range in case the temperature of the existing hull structure falls below the critical temperature after integration of independent tank 13.

In the converted vessel 43, a first liquefied hydrocarbon fluid may be stored in the added independent tank 13, while a second hydrocarbon fluid may be stored in an unconverted cargo tank, which can be any one of a centre cargo tank, a port side tank or a starboard side tank.

Figure 4D:
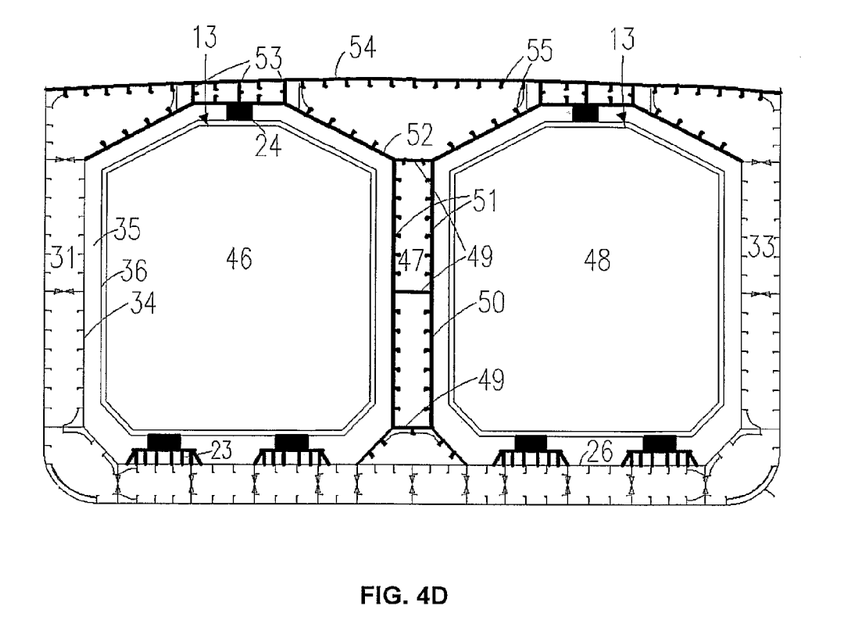
FIG. 4D is a mid-ship cross-sectional view of FIG. 4B according to one embodiment of the invention.

Reference is made to FIG. 4D illustrating a mid-ship cross-sectional view of FIG. 4B according to one embodiment of the invention. In the converted vessel 43, an added centre longitudinal bulkhead 47 is installed in the centre cargo tank 32 to form two separate added enclosures 46, 48. The added centre longitudinal bulkhead 47 may be a box structure comprising two parallel plates 50 and several platforms 49. Longitudinal stiffeners 51 may be provided on the inner parallel plates 50 to provide a longitudinal framing system. Several platforms 49 may be provided to support the parallel plates 50 to avoid large deformation of the parallel plates 50. Scantlings for the new centre longitudinal bulkhead 47 may be designed to withstand the longitudinal strength and deformation and the shear force. An added independent tank 13 is installed into the separate added enclosures 46 and 48 respectively on the existing double bottom hull structure. Similar to the embodiment of FIG. 4C, the inner bottom hull may be strengthened or reinforced by adding a new inner bottom hull plate to attach to existing inner bottom hull. Added tank support structures 23 may be installed on the existing inner bottom hull to support the independent tank 13 in under various load conditions. Chocks 24 may be installed on the top of the independent tank 13 to prevent rolling, pitching and floating movements of the independent tank 13. A hold space 35 between an inner shell plate 34 and an external surface 36 of the independent tank 13 may provide inspection access. A newly-constructed double deck structure, comprising a new upper deck 54, a new lower plate 52, longitudinal stiffeners 55 and several longitudinal deck girders 53, may be installed. Scantlings for the newly constructed double deck structure may be designed in a manner to withstand longitudinal strength and deformation and support the topside modules under all load conditions. Where a partial secondary barrier is required, one or more drip trays (not shown) may be provided upon the existing inner bottom plate to collect cryogenic cargo in case of the tank cargo leakage. The existing hull structures in hold space 35 should be protected in case the temperature of the existing hull structures falls below the critical temperature after the integration of independent tank 13. As such, an added insulation material 26 may be installed on a surface of the existing hull structures to avoid replacement of existing hull structure due to the low temperature after integration of the independent tank 13. Alternatively, a heating system (not shown) may be provided in the hold space 35 to maintain a temperature of existing hull structures within a limited range in case the temperature of the existing hull structure falls below the critical temperature after integration of independent tank 13.

In the converted vessel 43, a first liquefied hydrocarbon fluid may be stored in the added independent tank 13, while a second hydrocarbon fluid may be stored in an unconverted cargo tank, e.g. centre cargo tank, port side wing tank and starboard side wing tank.

Figure 5:
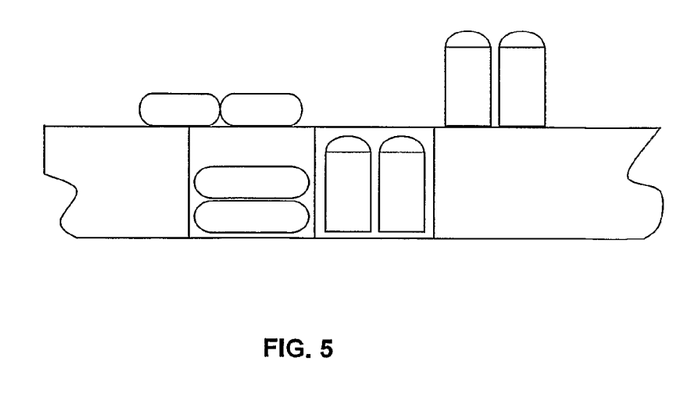
FIG. 5 illustrates possible arrangements of independent tanks on a converted vessel.

Reference is made to FIG. 5 illustrating a possible arrangement of added independent tanks on a converted vessel. As shown, two or more independent tanks may be arranged in a single centre tank. Further, the independent tanks may be arranged fully enclosed within the centre tank, or placed on a deck of the vessel. Further, the independent tanks may be partially enclosed by the centre tank where a portion of the independent tank may be partially exposed by a removed upper deck.

With the invention, a converted vessel can store multiple hydrocarbon and non-hydrocarbon products, e.g, crude oil, liquefied natural gas (LNG), liquefied petroleum gas (LPG) and condensate, in different forms, e.g. liquid, liquefied gas. This would be useful in situations where production capacity of one of the product, e.g. LNG, is substantially lower than a main product, e.g. crude oil, such that it would be commercially less viable to provide an additional vessel for storage. Moreover, the converted vessel for storing multiple hydrocarbon products would provide a commercial solution for offshore associated gas or non-associated gas. For instance, the converted vessel enables monetization of the associated gas instead of flaring and re-injection. Correspondingly, the converted vessel can serve as shuttle tanker to transport multiple hydrocarbon and non-hydrocarbon products to the terminals. In other applications, the converted vessel can serve as multiple hydrocarbon and non-hydrocarbon products floating storage unit, e.g. FPSO and FSO vessels.

Methods of tank integration and conversion of existing vessels are described below. It is to be appreciated that some of the steps may be omitted, modified, or interchanged as and when required.

In one embodiment, a method comprises cutting a portion of an upper deck overlaying a cargo tank selected for conversion; installing a tank support structure in the cargo tank selected for conversion; and installing at least one independent tank upon the tank support structure, wherein the at least one independent tank is operable to store a first liquefied hydrocarbon fluid, and at least one unconverted cargo tank is operable to store a second hydrocarbon fluid. The above may be useful for converting from a double hull vessel into a converted double hull vessel with tank integration. Additionally, the above provides basic steps for various aspects as described below.

According to one aspect, conversion of a centre cargo tank is desired.

According to one aspect, conversion of a port side wing tank or a starboard side wing tank in a double hull oil tanker may be desired. For this purpose, in the method above, cutting a portion of an upper deck includes cutting a portion of an upper deck overlaying at least one of the port side wing tank and the starboard side wing tank. Further, the method further comprises installing an other tank support structure in the at least one of the port side wing tank and the starboard side wing tank; and installing an other independent tank upon the other tank support structure, wherein the other independent tank is for storing of the first liquefied hydrocarbon fluid.

According to one aspect, the method may further comprise installing an intermediate deck plate in the cargo tank selected for conversion, wherein the intermediate deck plate is spaced apart over an existing hull structure; and installing a plurality of support members interposed between the intermediate deck plate and the existing hull structure. The above may be useful for converting from a single hull vessel into a converted double hull vessel with tank integration, or converting from a double hull vessel into a converted double hull vessel with tank integration.

In addition to the preceding paragraph, the method may further comprise installing a longitudinal bulkhead interposed between the intermediate deck plate and the existing hull structure to define at least one added enclosure in cooperation with at least one side wall of the cargo tank selected for conversion, wherein the at least one added enclosure is operable to store the second hydrocarbon fluid. Optionally, the at least one added enclosure may be provided in fluid communication with an adjacent unconverted tank, e.g. port side tank or starboard side tank. The above may be useful for providing different tanks or added enclosures for storing different fluid products.

According to yet another aspect, the method may further comprise installing at least one longitudinal bulkhead interposed between the newly-attached upper deck and an existing hull structure for defining a plurality of added enclosures in cooperation with at least one side wall of the cargo tank selected for conversion, wherein the at least one added independent tank is disposed in the at least one of the plurality of added enclosures, and wherein installing a tank support structure in the cargo tank selected for conversion includes installing a tank support structure in the at least one of the plurality of added enclosures. The above may be useful for converting from a double hull vessel into a converted double hull vessel with tank integration, and providing a plurality of partitions or added enclosures within the converted cargo tank.

In the various aspects described above, the method may further comprise storing the first liquefied hydrocarbon fluid in the at least one independent tank; and storing the second hydrocarbon fluid in the at least one unconverted cargo tank. The unconverted cargo tank may be a centre cargo tank, a port side wing tank or a starboard side wing tank.

In the various aspects above, the method may further comprise installing a newly-constructed upper deck for enclosing the at least one independent tank in the cargo tank selected for conversion, a cut portion of an existing upper deck or a modified cut portion of the existing upper deck. The new upper deck may be a double deck structure. If a modified cut portion of the existing upper deck is installed, the method further comprises modifying the cut portion of the existing upper deck.

In the various aspects above, the method may further comprise selecting the cargo tank to be converted from one of a centre cargo tank, a port side wing tank and a starboard side wing tank. It is to be appreciated that any combinations of the various cargo tanks may be selected to be converted.

Other embodiments will be apparent to those skilled in the art from consideration of the specification and practice of the invention. Furthermore, certain terminology has been used for the purposes of descriptive clarity, and not to limit the disclosed embodiments of the invention. The embodiments and features described above should be considered exemplary, with the invention being defined by the appended claims.

The invention claimed is:

1. A tank-integrated vessel, converted from an existing vessel, for storing multiple hydrocarbon products, the tank-integrated vessel comprising:
   at least one converted tank comprising:
      an added tank support structure disposed in the at least one converted tank;
      at least one added independent tank disposed upon the added tank support structure, wherein the added independent tank is operable to store a first liquefied hydrocarbon fluid;
      a newly-attached upper deck overlaying the at least one added independent tank; and
      at least an added chock interposed between the newly-attached upper deck and the at least one added independent tank, and at least one unconverted tank operable to store a second hydrocarbon fluid.

2. The tank-integrated vessel of claim 1, wherein the first hydrocarbon fluid is one of a liquefied natural gas, a liquefied petroleum gas and a gas condensate, and the second hydrocarbon fluid is a crude oil.

3. The tank-integrated vessel of claim 2, wherein the tank integrated vessel is one of a Floating Production Storage and Offloading (FPSO) vessel, a Floating Storage and Offloading (FSO) vessel and a shuttle tanker.

4. The tank-integrated vessel of claim 1, wherein the at least one converted tank is at least one of a center tank, a port side wing tank and a starboard side wing tank.

5. The tank-integrated vessel of claim 1, wherein the at least one converted tank further comprising:
   an added intermediate deck plate disposed in the at least one converted tank and spaced apart over an existing hull structure; and
   a plurality of added support members interposed between the added intermediate deck plate and the existing hull structure.

6. The tank-integrated vessel of claim 5, wherein the plurality of added support members further include: a plurality of added longitudinal stiffeners installed on an underside of the added intermediate deck plate, and a plurality of added longitudinal girders connecting the added intermediate deck plate and the existing hull structure.

7. The tank-integrated vessel of claim 5, wherein the at least one converted tank further comprising:
   an added longitudinal bulkhead interposed between the added intermediate deck plate and the existing hull structure for defining at least one added enclosure in cooperation with at least one side wall of the at least one converted tank.

8. The tank-integrated vessel of claim 1, wherein the at least one converted tank further comprising:
   an added longitudinal bulkhead interposed between the newly-attached upper deck and an existing hull structure for defining a plurality of added enclosures wherein the at least one added independent tank is disposed in at least one of the plurality of added enclosures.

9. The tank-integrated vessel of claim 1, wherein the newly-attached upper deck is one of a cut portion from an existing upper deck and a modified cut portion from an existing upper deck.

10. The tank-integrated vessel of claim 1, wherein the at least one converted tank further comprising: an insulation material disposed on an existing hull structure, wherein the insulation material is operable to maintain a temperature of the existing hull structure within a range when the temperature of the existing hull structure falls below a critical value.

11. The tank-integrated vessel of claim 10, wherein the insulation material is operable as a secondary barrier to protect the existing hull structure from a leakage from the at least one added independent tank.

12. The tank-integrated vessel of claim 1, wherein the at least one converted tank further comprising: a heating system operable to maintain a temperature of an existing hull structure within a range when the temperature of the existing hull structure falls below a critical value.

13. A tank-integrated vessel, converted from an existing vessel, for storing multiple hydrocarbon products, the tank-integrated vessel comprising:
   at least one converted tank comprising:
      an added tank support structure disposed in the at least one converted tank;
      at least one added independent tank disposed upon the added tank support structure, wherein the added independent tank is operable to store a first liquefied hydrocarbon fluid;
      a newly-attached upper deck overlaying the at least one added independent tank, and
   at least one unconverted tank operable to store a second hydrocarbon fluid.

14. The tank-integrated vessel of claim 13, wherein the first hydrocarbon fluid is one of a liquefied natural gas, a liquefied petroleum gas and a gas condensate, and the second hydrocarbon fluid is a crude oil.

15. The tank-integrated vessel of claim 14, wherein the tank integrated vessel is one of a Floating Production Storage and Offloading (FPSO) vessel, a Floating Storage and Offloading (FSO) vessel and a shuttle tanker.

16. The tank-integrated vessel of claim 13, wherein the at least one converted tank is at least one of a center tank, a port side wing tank and a starboard side wing tank.

17. The tank-integrated vessel of claim 13, wherein the at least one converted tank further comprising:
   an added intermediate deck plate disposed in the at least one converted tank and spaced apart over an existing hull structure; and
   a plurality of added support members interposed between the added intermediate deck plate and the existing hull structure.

18. The tank-integrated vessel of claim 17, wherein the plurality of added support members further include: a plurality of added longitudinal stiffeners installed on an underside of the added intermediate deck plate, and a plurality of added longitudinal girders connecting the added intermediate deck plate and the existing hull structure.

19. The tank-integrated vessel of claim 17, wherein the at least one converted tank further comprising:
   an added longitudinal bulkhead interposed between the added intermediate deck plate and the existing hull structure for defining at least one added enclosure in cooperation with at least one side wall of the at least one converted tank.

20. The tank-integrated vessel of claim 13, wherein the at least one converted tank further comprising:
an added longitudinal bulkhead interposed between the newly-attached upper deck and an existing hull structure for defining a plurality of added enclosures wherein the at least one added independent tank is disposed in at least one of the plurality of added enclosures.

21. The tank-integrated vessel of claim 13, wherein the newly-attached upper deck is one of a cut portion from an existing upper deck and a modified cut portion from an existing upper deck.

22. The tank-integrated vessel of claim 13, wherein the at least one converted tank further comprising: an insulation material disposed on an existing hull structure, wherein the insulation material is operable to maintain a temperature of the existing hull structure within a range when the temperature of the existing hull structure falls below a critical value.

23. The tank-integrated vessel of claim 22, wherein the insulation material is operable as a secondary barrier to protect the existing hull structure from a leakage from the at least one added independent tank.

24. The tank-integrated vessel of claim 13, wherein the at least one converted tank further comprising: a heating system operable to maintain a temperature of an existing hull structure within a range when the temperature of the existing hull structure falls below a critical value.

25. A method of tank integration and conversion of a vessel for storing multiple hydrocarbon products, the method comprising:
cutting a portion of an existing upper deck overlaying a tank selected for conversion;
installing a tank support structure in the tank selected for conversion;
installing an intermediate deck plate in the tank selected for conversion, wherein the intermediate deck plate is spaced apart over an existing hull structure;
installing a plurality of support members interposed between the intermediate deck plate and the existing hull structure;
installing at least one independent tank upon the tank support structure; and
disposing a newly-attached upper deck for enclosing the at least one independent tank in the tank selected for conversion, wherein the at least one independent tank is operable to store a first liquefied hydrocarbon fluid, and at least one unconverted tank is operable to store a second hydrocarbon fluid.

26. The method of claim 25, further comprising:
installing a longitudinal bulkhead interposed between the intermediate deck plate and the existing hull structure to define at least one added enclosure in cooperation with at least one side wall of the tank selected for conversion, wherein the at least one added enclosure is operable to store the second hydrocarbon fluid.

27. The method of claim 25, wherein cutting a portion of an upper deck includes cutting a portion of an upper deck overlaying at least one of the port side wing tank and the starboard side wing tank, the method further comprising:
installing an other tank support structure in the at least one of the port side wing tank and the starboard side wing tank; and
installing an other independent tank upon the other tank support structure, wherein the other independent tank is operable to store the first liquefied hydrocarbon fluid.

28. A method of tank integration and conversion of a vessel for storing multiple hydrocarbon products, the method comprising:
cutting a portion of an existing upper deck overlaying a tank selected for conversion;
installing a tank support structure in the tank selected for conversion;
installing at least one longitudinal bulkhead interposed between the newly-attached upper deck and an existing hull structure for defining a plurality of added enclosures in cooperation with at least one side wall of the tank selected for conversion, wherein the at least one added independent tank is disposed in at least one of the plurality of added enclosures, and wherein installing a tank support structure in the tank selected for conversion includes installing a tank support structure in the at least one of the plurality of added enclosures;
installing at least one independent tank upon the tank support structure; and
disposing a newly-attached upper deck for enclosing the at least one independent tank in the tank selected for conversion, wherein the at least one independent tank is operable to store a first liquefied hydrocarbon fluid, and at least one unconverted tank is operable to store a second hydrocarbon fluid.

29. The method of claim 28, wherein cutting a portion of an upper deck includes cutting a portion of an upper deck overlaying at least one of the port side wing tank and the starboard side wing tank, the method further comprising:
installing an other tank support structure in the at least one of the port side wing tank and the starboard side wing tank; and
installing an other independent tank upon the other tank support structure, wherein the other independent tank is operable to store the first liquefied hydrocarbon fluid.

* * * * *